United States Patent
Yasuma

(10) Patent No.: US 8,856,915 B2
(45) Date of Patent: Oct. 7, 2014

(54) SECURITY COMMUNICATION APPARATUS AND SECURITY COMMUNICATION METHOD

(75) Inventor: Kensuke Yasuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1299 days.

(21) Appl. No.: 12/350,150

(22) Filed: Jan. 7, 2009

(65) Prior Publication Data

US 2009/0177879 A1  Jul. 9, 2009

(30) Foreign Application Priority Data

Jan. 8, 2008 (JP) .................. 2008-001395

(51) Int. Cl.
*G06F 9/00* (2006.01)
*H04L 29/06* (2006.01)

(52) U.S. Cl.
CPC .......... H04L 63/105 (2013.01); *H04L 63/0272* (2013.01)
USPC ................... 726/15; 726/11; 726/12; 726/13; 726/14

(58) Field of Classification Search
USPC .................................................. 726/11–15
See application file for complete search history.

(56) References Cited

U.S. PATENT DOCUMENTS

| | | | |
|---|---|---|---|
| 6,289,398 B1* | 9/2001 | Stallmo et al. ................ 710/5 |
| 2001/0054155 A1* | 12/2001 | Hagan et al. ................ 713/193 |
| 2002/0150237 A1* | 10/2002 | DiSanto et al. .............. 380/28 |
| 2003/0226009 A1* | 12/2003 | Maeda et al. ................ 713/150 |
| 2004/0091104 A1* | 5/2004 | Kawamura et al. ........... 380/28 |
| 2006/0041761 A1* | 2/2006 | Neumann et al. ............ 713/189 |
| 2006/0282668 A1* | 12/2006 | Leitch .......................... 713/171 |
| 2007/0276958 A1* | 11/2007 | Curtis et al. ................ 709/238 |
| 2009/0052538 A1* | 2/2009 | Watanabe et al. ........ 375/240.23 |
| 2011/0051932 A1* | 3/2011 | Hoover et al. ................ 380/270 |

FOREIGN PATENT DOCUMENTS

| | | |
|---|---|---|
| JP | 2002-101127 A | 4/2002 |
| JP | 2002-314587 | 10/2002 |
| JP | 2003-244194 A | 8/2003 |
| JP | 2006-121533 A | 5/2006 |
| JP | 2006-279221 | 10/2006 |

OTHER PUBLICATIONS

Cheng et al., Design and Implementation of Cross-Domain Cooperative Firewall, Network Protocols, 2007. ICNP 2007. IEEE International Conference, pp. 284-293.*

Malkin, Gary, Dial-in Virtual Private Networks Using Layer 3 Tunneling, Local Computer Networks, 1997. Proceedings., 22nd Annual Conference on, pp. 555-561.*

* cited by examiner

*Primary Examiner* — Christopher Brown
*Assistant Examiner* — Roderick Tolentino
(74) *Attorney, Agent, or Firm* — Canon USA Inc. IP Division

(57) ABSTRACT

A negotiation unit, of a logical network control apparatus connected to a LAN, judges settings of processing to be performed on communication data by a network connection apparatus, from properties of an application to be used in communication, and decides parameters to be used for a VPN connection. The VPN connection is performed using the determined parameters.

15 Claims, 8 Drawing Sheets

FIG. 7

| APPLICATION NAME | ViewerApplication |
|---|---|
| VERSION | 1.0 |
| IP ADDRESS | 192.168.0.2 |
| PORT NO. | 8080 |
| DATA TYPE | streaming |
| NECESSITY OF ENCRYPTION | yes |
| ENCRYPTION AT HIGHER LAYER | no |
| DELAY | low |
| PRIORITY | 3 |

701: rows 1–4
702: rows 5–9

FIG. 8

| | DATA TYPE | ENCRYPTION | ENCRYPTION AT HIGHER LAYER | DELAY | PRIORITY |
|---|---|---|---|---|---|
| 1 | streaming | no | no | low | 5 |
| 2 | streaming | yes | no | low | 3 |
| 3 | streaming | yes | yes | low | 1 |
| 4 | data | no | no | high | 5 |
| 5 | data | yes | no | high | 3 |
| 6 | data | yes | yes | high | 1 |

FIG. 9

| | TRANSPORT PROTOCOL | PACKET ENCRYPTION | PACKET COMPRESSION | BUFFERING | PRIORITY CONTROL (PRIORITY) |
|---|---|---|---|---|---|
| 1 | UDP | UNNECESSARY | UNAVAILABLE | UNAVAILABLE | HIGH |
| 2 | UDP | NECESSARY | UNAVAILABLE | UNAVAILABLE | MID |
| 3 | UDP | UNNECESSARY | UNAVAILABLE | UNAVAILABLE | LOW |
| 4 | UDP | UNNECESSARY | AVAILABLE | AVAILABLE | HIGH |
| 5 | UDP | NECESSARY | AVAILABLE | AVAILABLE | MID |
| 6 | UDP | UNNECESSARY | AVAILABLE | AVAILABLE | LOW |

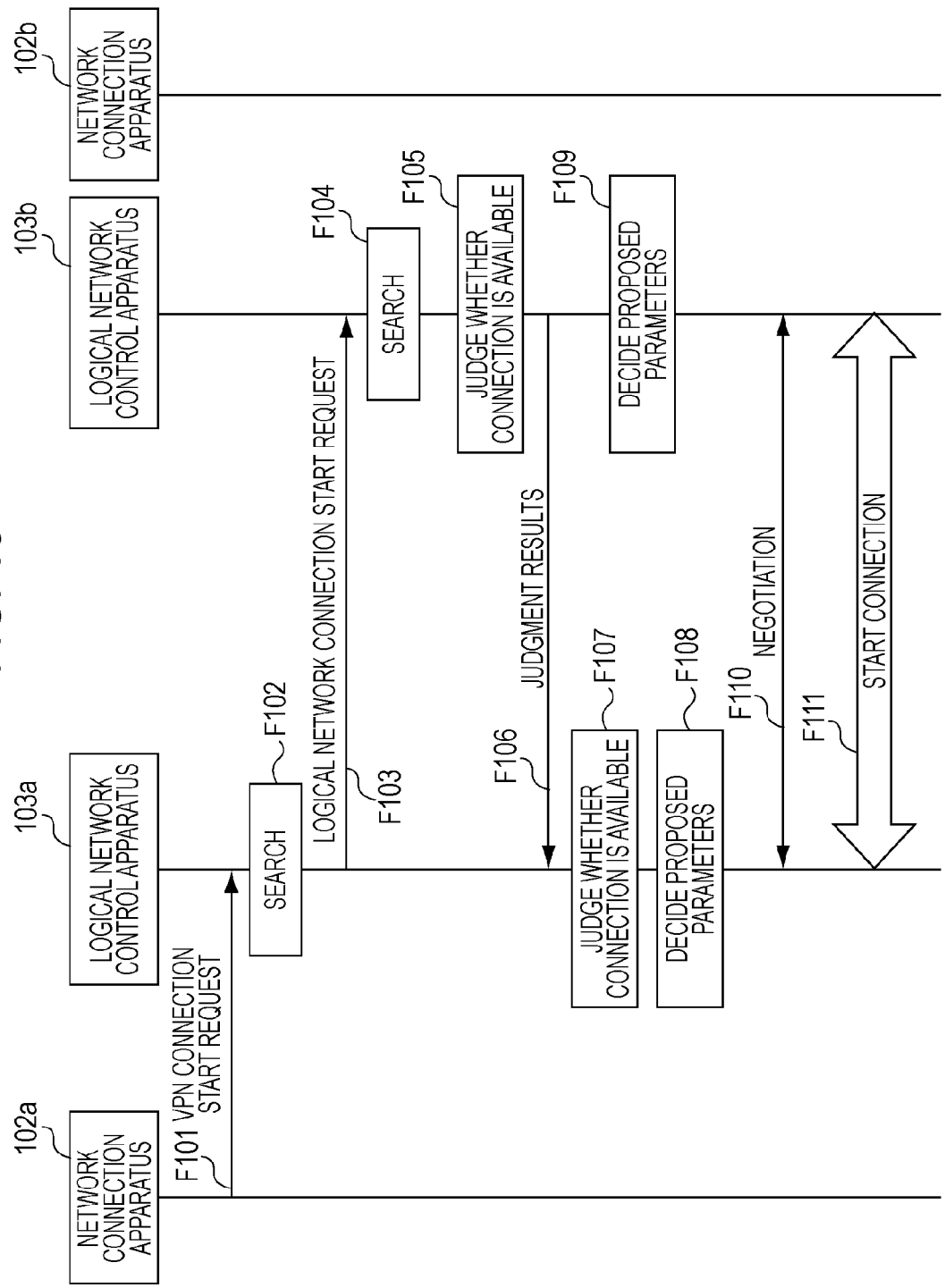

SECURITY COMMUNICATION APPARATUS AND SECURITY COMMUNICATION METHOD

BACKGROUND OF THE INVENTION

1. Field of the Invention

The present invention relates to a security communication apparatus and a security communication method, more specifically, relating communication data in communication over a network in which communication security has been ensured.

2. Description of the Related Art

Heretofore, with communication over a network, a network-side system has assigned network resources, assigned routes, and so forth, in accordance with the quality and properties of communication requested by the user side. Japanese Patent Laid-Open No. 2006-279221 discloses cooperation between a network resource management system and a global resource management system with network resources and so forth within a service provider being managed in accordance with bandwidth and resource securing time, and so forth, requested by a user application. Also, Japanese Patent Laid-Open No. 2002-314587 discloses determining of a VPN (Virtual Private Network) path in accordance with QoS (Quality of Service) requested by the user.

However, in a case of communication apparatuses exchanging data based on a network connection at a security communication apparatus, the processing performed by the communication apparatuses and security communication apparatus may impede efficient communication in some cases. For example, the security communication apparatus may perform processing not necessary for an application used by a communication apparatus, or quality such a throughput demanded by the application may not be able to be attained depending on the processing performed by the security communication apparatus.

As a more specific example, in the event that a communication apparatus performs encryption of communication data at the application level when performing VPN communication via a security communication apparatus, the communication data may be encrypted redundantly with the VPN encryption performed by the security communication apparatus.

Also, as another example, performing buffering or packet compression at the security communication apparatus when using a real-time streaming application, problems such as delay may occur.

On the other hand, setting parameters used for network connection for each apparatus at the user side requires advanced knowledge and skills regarding networks, and further setting of the parameters is troublesome.

SUMMARY OF THE INVENTION

An embodiment of the present invention provides for enabling communication performed based on network communication by a security communication apparatus in an efficient manner.

According to an aspect of the present invention, a security communication apparatus connected to a first network and configured to realize communication with security ensured between the first network and a second network, the apparatus including: a judging unit configured to judge whether communication data is to be encrypted by a communication apparatus connected to the first network, a receiving unit configured to receive first communication data from the communication apparatus, a converting unit configured to encrypt the first communication data received from the communication apparatus to convert into second communication data, when the judging unit judges that the communication data is not to be encrypted by the communication apparatus, and a transmitting unit configured to transmit the first communication data received from the communication apparatus to a second security communication apparatus connected to the second network when the judging unit judges that the communication data is to be encrypted by the communication apparatus, and when the judging unit judges that the communication data is not to be encrypted by the communication apparatus, transmit the second communication data converted by the converting unit, to the second security communication apparatus connected to the second network.

Further features of the present invention will become apparent from the following description of exemplary embodiments with reference to the attached drawings.

BRIEF DESCRIPTION OF THE DRAWINGS

FIG. 7 is an example of application information transmitted from a network communication apparatus with the embodiment.

FIG. 8 is an example of application properties registered in an application property determination unit with the embodiment.

FIG. 9 is an example of parameters determined from application properties with the embodiment.

FIG. 10 is a diagram illustrating the overall flow of VPN connection starting processing.

DESCRIPTION OF THE EMBODIMENTS

The following is a description of embodiments of the invention, with reference to the drawings.

Figure 1:
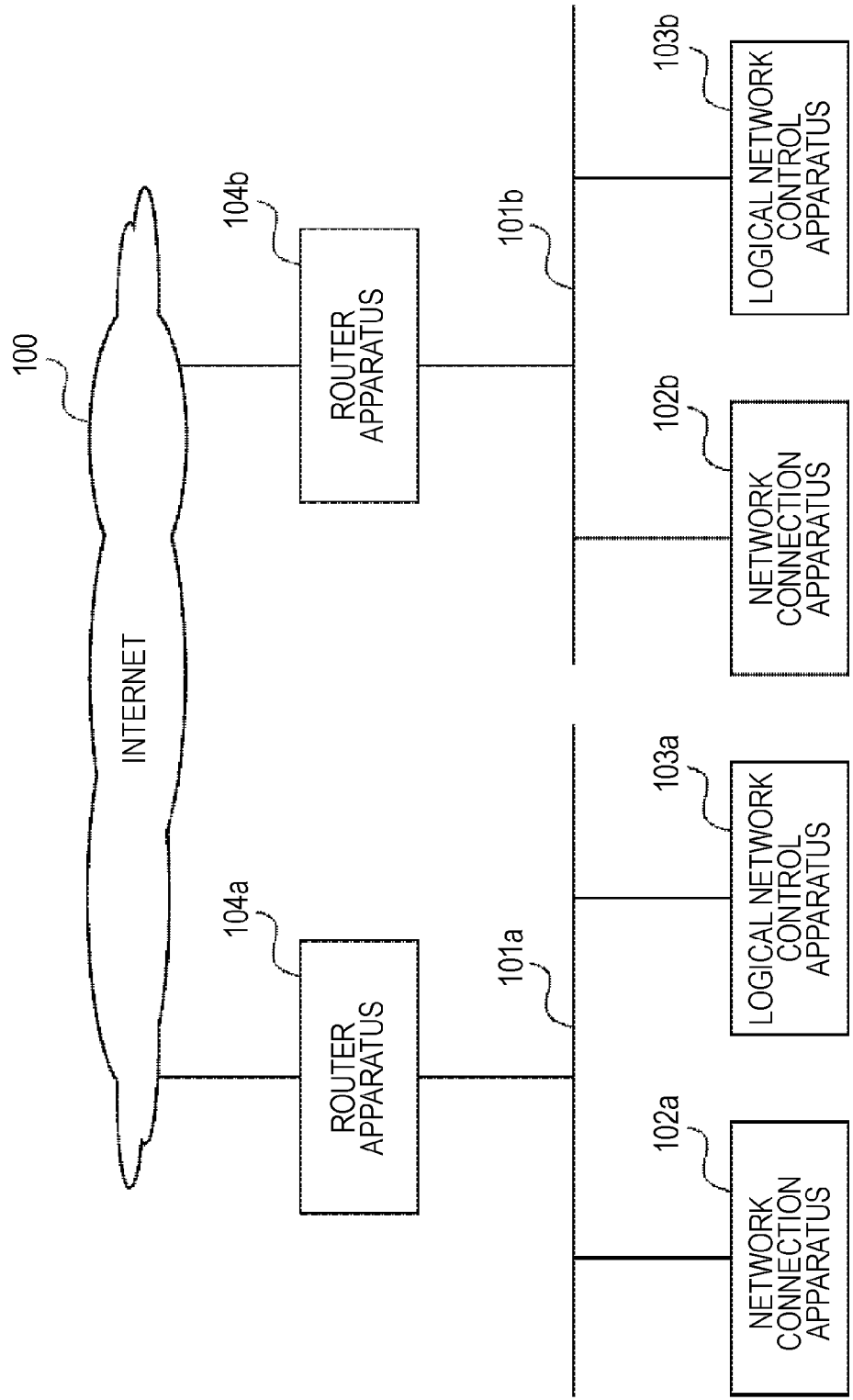
FIG. 1 is a configuration diagram of a network system according to an embodiment of the present invention.

FIG. 1 is a configuration diagram of a network system according to a first embodiment. Reference numeral 100 denotes the Internet. Rather, while the present embodiment will be described with reference numeral 100 referring to the Internet, this Internet 100 is not restricted to the Internet as such and may be a WAN (Wide Area Network), LAN (Local Area Network), ad hoc network, or the like, or may be a combination thereof. In the same way, while reference numerals 101a and 101b denote LANs, the LANs 101a and 101b are not restricted to LANs as such and may be WANs, LANs, ad hoc networks, or the like, or may be a combination thereof. With the present embodiment, the LAN 101a (first network) and the LAN 101b (second network) are networks having the same functions.

Reference numeral 102a denotes a network connection apparatus connected to the LAN 101a (first network) and which performs communication using an application. Also, reference numeral 102b denotes a network connection apparatus connected to the LAN 101b (second network) and which performs communication using an application. With the present embodiment, the network connection apparatuses 102a and 102b are communication apparatuses having the same functions.

Reference numeral 103a denotes a logical network control apparatus connected to the LAN 101a (first network) and which realizes VPN connection in accordance with the properties of the application which the network connection apparatus 102a uses. That is to say, the logical network control apparatus 103a is a security communication apparatus for realizing communication with ensured security between the LAN 101a (first network) and the LAN 101b (second network). Also, reference numeral 103b denotes a logical network control apparatus connected to the LAN 101b (second network) and which realizes VPN connection in accordance with the properties of the application which the network connection apparatus 102b uses. That is to say, the logical network control apparatus 103b is a security communication apparatus for realizing communication with ensured security between the LAN 101a (first network) and the LAN 101b (second network). Note that with the present embodiment, the logical network control apparatuses 103a and 103b are security communication apparatuses having the same function.

Reference numerals 104a and 104b are router apparatuses for connecting to the Internet 100 and the LANs 101a and 101b, to perform packet route control and so froth. With the present embodiment, the router apparatuses 104a and 104b are network apparatuses having the same functions.

Figure 2:
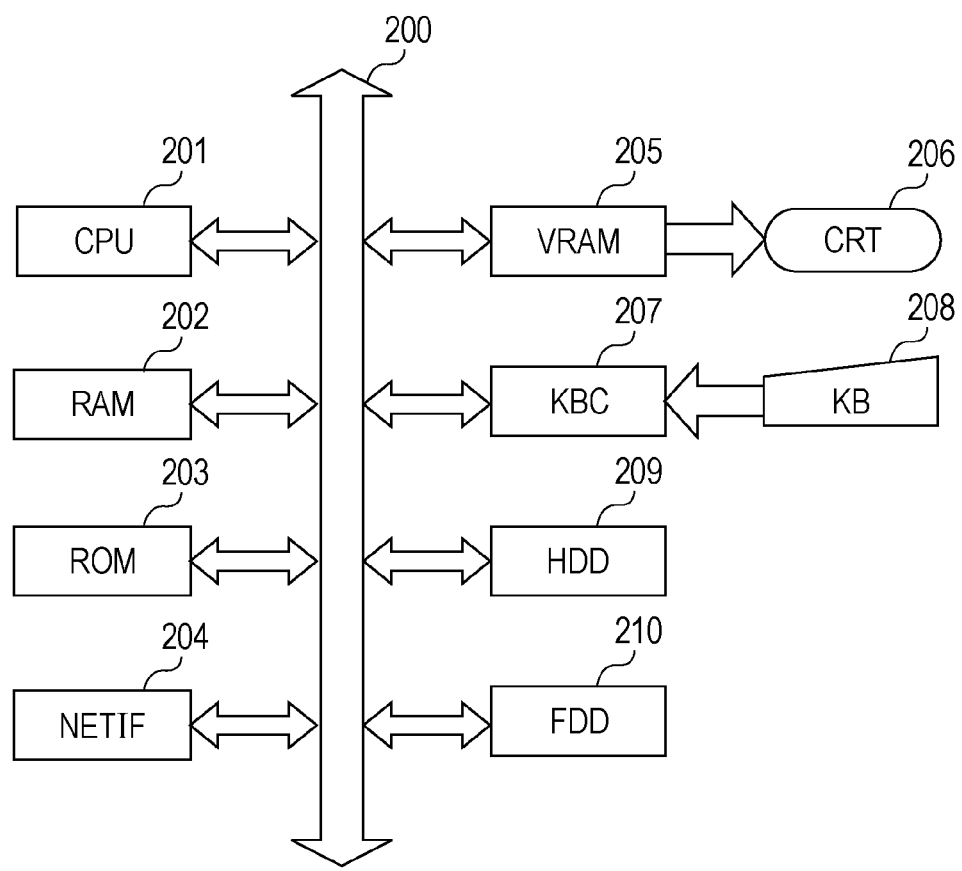
FIG. 2 is a hardware configuration diagram of a logical network control apparatus.

FIG. 2 is a configuration diagram of the logical network control apparatus 103a. The logical network control apparatus 103a is a security communication apparatus for realizing communication with ensured security between the LAN 101a (first network) and the LAN 101b (second network). Also, the logical network control apparatus 103b is a security communication apparatus having the same functions as the logical network control apparatus 103a.

The logical network control apparatus 103a may be a computer system such as a PC (personal computer), but is not restricted to this, and may be a workstation, notebook PC, palmtop PC, various types of home electronic appliances such as televisions having built-in computers, gaming consoles having communication functions, cellular telephones, and other like terminals having communication functions for communicating with other network control apparatuses, or combinations of these.

Reference numeral 201 denotes a CPU (Central Processing Unit) which controls the computer system. Reference numeral 202 denotes RAM (Random Access Memory) which functions as main memory of the CPU 201, and also as a region for executing programs, execution area for the programs, and a data area. Reference numeral 203 is ROM (Read Only Memory) storing operation processing procedures of the CPU 201. The ROM 203 is configured of program ROM storing the OS (Operating System) which is a system program for performing apparatus control of the computer system, and data ROM storing information necessary for running the system. A later-described HDD 209 may be used instead of the ROM 203.

Reference numeral 204 denotes a network interface (hereinafter also abbreviated to "NETIF"), and performs control for performing data transfer between computer systems via networks and for performing diagnosis of connection states. That is to say, the logical network control apparatus 103a performs connection to the LAN 101a (first network) via the NETIF 204. Also, the logical network control apparatus 103a exchanges data with the LAN 101b (second network), including relaying of communication data of a communication apparatus connected to the LAN 101a (first network), via the NETIF 204.

Reference numeral 205 denotes VRAM (Video RAM), for rendering an image to be displayed on the screen of a later-described CRT 206 indicating the running state of the computer system, and controlling the display. Reference numeral 206 denotes a display apparatus, such as a so-called display, and will hereinafter be referred to as a "CRT".

Reference numeral 207 denotes a controller for controlling input signals from a later-described external input apparatus 208. Reference numeral 208 denotes an external input apparatus for accepting operations performed by a user of the computer system as to the computer system, an example thereof being a keyboard.

Reference numeral 209 denotes a storage apparatus, such as a hard disk for example. The storage apparatus 209 is used for storing application programs, and for storing data such as image information. An application program with the present embodiment is a software program for executing control of a logical network making up the present embodiment, and so forth.

Reference numeral 210 denotes an external input/output apparatus, for input/output of removable recording media such as a floppy disk drive, a CD-ROM drive, and so forth, used for reading out the above-described application programs for the medium. The external input/output apparatus will be referred to as "FDD" hereinafter. Note that application programs and data stored in the HDD 209 can also be stored in the FDD 210 and used.

Reference numeral 200 denotes an input/output bus (address bus, data, bus, and control bus) for connecting the above-described units.

Figure 3:
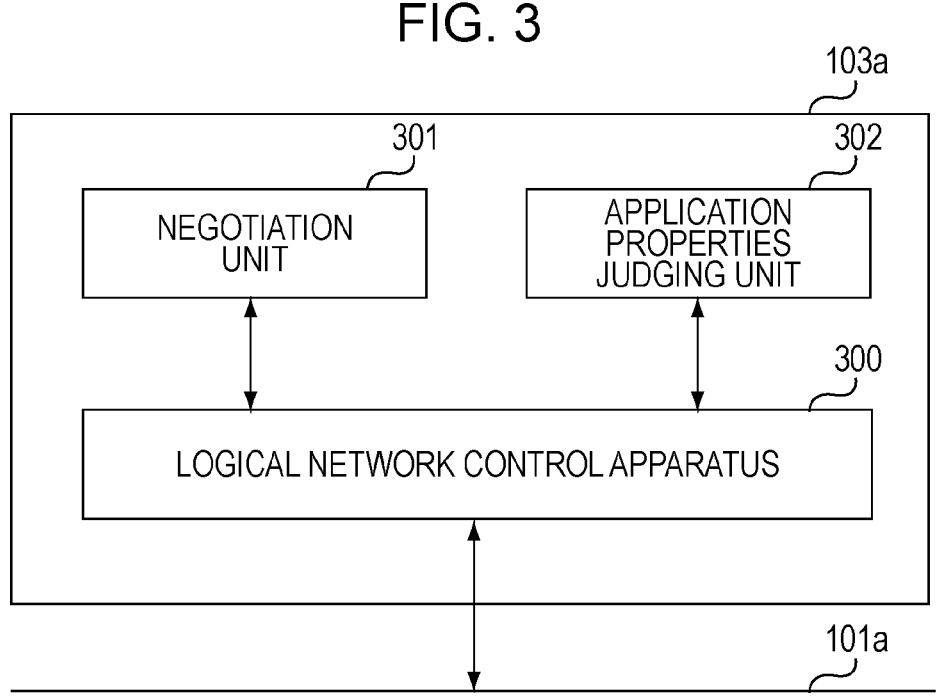
FIG. 3 is a module configuration diagram of a logical network control apparatus.

FIG. 3 is a module configuration of the logical network control apparatus 103a according to the present embodiment. The logical network control apparatus 103a stores the functions of the modules described below in the HDD 209 as programs, to be read out and executed by the CPU 201 as appropriate, thereby realizing the functions.

The logical network control apparatus 103a is a security communication apparatus for realizing communication with ensured security between the LAN 101a (first network) and LAN 101b (second network). Also, the logical network control apparatus 103b is a security communication apparatus having the same function as the logical network control apparatus 103a.

Reference numeral 300 denotes a logical network control unit for exchanging various types of message between the logical network control apparatus 103a and network connection apparatuses 102a connected to the LAN 101a (first network). Also, the logical network control unit 300 realizes VPN connection in accordance with parameters decoded based on settings of the network connection apparatuses 102a. That is to say, the logical network control unit 300 converts communication data received from a network connection apparatus 102a into communication data for ensuring security, in accordance with processing by a communication apparatus (network connection apparatus 102a), and transmits the converted communication data to the logical network control apparatus 103b. Also, the logical network control unit 300 converts communication data received from the logical network control apparatus 103b that has been subjected to processing for ensuring security, and transmits the converted communication data to the network connection apparatus 102a.

Reference numeral 301 denotes a negotiation unit for determining parameters to be used at the time of the logical network control unit 300 performing a VPN connection, by negotiation with the logical network control apparatus 103b. Also, the negotiation unit 301 determines parameters to be proposed to the logical network control apparatus 103b, based on properties of the application to be used by the network connection apparatus 102a for connection. That is to say, the negotiation unit 301 judges settings for communication (application properties) at the communication apparatus (network connection apparatus 102a) connected to the LAN 101a (first network), at the time of executing communication. The negotiation unit 301 determines candidates for conversion parameters relating to conversion of communication data received from the network connection apparatus 102a, in accordance with the judged settings, and transmits the determined candidates to the logical network control apparatus 103b. A method for determining parameters with the negotiation unit 301 will be described later.

Reference numeral 302 is an application property judging unit for holding application information received from the network connection apparatus 102a, and judging whether or not VPN connection can be made in accordance with the application properties included in the application information.

Figure 4:
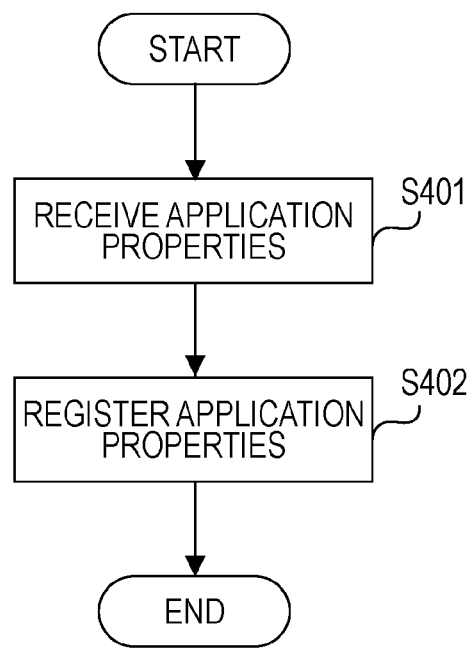
FIG. 4 is a flowchart illustrating the flow of registration processing of application information according to the embodiment.

Next, procedures for registering application information relating to applications used at the network connection apparatus 102a, with the logical network control apparatus 103a, will be described with reference to FIG. 4. FIG. 4 is a flowchart illustrating the flow of application information registration processing at the logical network control apparatus 103a.

The logical network control apparatus 103a is a security communication apparatus for realizing communication with ensured security between the LAN 101a (first network) and LAN 101b (second network). Note that the logical network control apparatus 103b connected to the LAN 101b (second network) also registers application information relating to applications used at the network connection apparatus 102b.

In step S401, the logical network control unit 300 of the logical network control apparatus 103a receives application information transmitted from the network connection apparatus 102a, and advances to step S402. The application information transmitted from the network connection apparatus 102a includes identification information and application properties.

FIG. 7 shows an example of application information transmitted from the network connection apparatus 102a. In FIG. 7, identification information 701 is an application name, version, IP address of network connection apparatus 102a, and port No. which the application uses. Application properties 702 is data type, necessity of encryption, encryption at higher layer, delay, priority, and so forth.

Note that the ViewerApplication shown as the application name is the name of application software for displaying images based on image data that is exchanged. However, the application is not restricted to this, and various types of applications can be used. Also, the IP address of the network connection apparatus 102a may be judged by the logical network control apparatus 103a based on the transmission source of the application information.

In step S402, the logical network control unit 300 registers the received application information in the application property judging unit 302, and ends application information registration information. That is to say, the application property judging unit 302 of the logical network control apparatus 103a (security communication apparatus) stores the settings (application properties 702) of the network connection apparatus 102a (communication apparatus) in a manner correlated with the identification information (identification information 701) of the processing.

FIG. 8 illustrates the application properties 702 of multiple applications registered in the application property judging unit 302. Here, application No. 801 holds information for identifying the applications, and corresponds to the identification information 701 received in step S401. Based on the application name, application properties 702 can be searched and read out, for example. In this case, the application property judging unit 302 stores application properties so as to be able to identify one number in application No. 801 from the application name.

Note that while application properties are searched from the application name with the present embodiment, an arrangement may be made wherein searching is performed with a combination of application name and version information. Also, taking into consideration cases wherein application settings differ from one network connection apparatus 102 to another, application properties 702 may be searched by further combining IP address identification information. In this case, the application property judging unit 302 stores application properties so as to be able to identify one number in application No. 801 from the application name, version, and IP address information. FIG. 8 shows that the application properties 702 of six applications, application 1 through application 6, indicated by the numbers in application No. 801, are stored in the application property judging unit 302.

Data type 802 indicates the type of data which the application uses. Here, "streaming" indicates a data type demanding real-time nature. Also, "data" indicates a data type regarding which throughput is important.

Encryption 803 indicates whether or not encryption of the communication data is necessary. In the event that the item of encryption 803 is "yes", this indicates that encryption of the communication data is necessary. In the event that the item of encryption 803 is "no", this indicates that encryption of the communication data is not necessary.

Encryption at higher layer 804 indicates whether encryption of communication data is performed at the application level. In the event that encryption at higher layer 804 is "yes", this indicates that encryption of communication data is performed at the application level. On the other hand, in the event of "no", this indicates that encryption of communication data is performed at the application level.

Delay 805 indicates the delay amount which the application can permit. In the event that the delay 805 is "low", this means that the application demands communication with low delay. On the other hand, in the event that delay 805 is "high", this indicates an application regarding which a large delay is not problematic.

Priority 806 represents the priority of processing by the application. With the present embodiment, in the event that the priority 806 is "5", this means that the application demands processing with the highest priority. On the other hand, in the event that the priority 806 is "1", this means that the application does not demand processing with priority.

The application shown in FIG. 7 according to the present embodiment is the application No. 2 shown in FIG. 8. Next, procedures for starting VPN connection between the logical network control apparatus 103a and the logical network control apparatus 103b will be described. First, the overall flow of VPN connection starting processing will be described with reference to FIG. 10. The logical network control apparatus 103a is a security communication apparatus for realizing communication with ensured security between the LAN 101a (first network) and LAN 101b (second network). Also, the logical network control apparatus 103b is a security communication apparatus having the same functions as the logical network control apparatus 103a. Messages and communication data transmitted from the logical network control apparatus 103a to the logical network control apparatus 103b are sent from the logical network control apparatus 103a to the logical network control apparatus 103b via the router apparatus 104a, the Internet, and the router apparatus 104b.

The logical network control apparatus 103a receives a VPN connection start request from a network connection apparatus 102a connected to the LAN 101a (first network) (F101). The logical network control apparatus 103a which has received the connection start request uses the identification information of the application (application name) included in the connection start request to search for the corresponding application properties, and reads out the discovered application properties (F102). The logical network control apparatus 103a which has read out the application properties transmits a logical network connection request including application identification information (application name) and read out application properties, to the logical network control apparatus 103b (F103). As described earlier, the application properties are data type, necessity of encryption, higher order encryption, delay, priority, and so forth. Processing such as encryption performed at the higher layer is processing performed by the network connection apparatus 102a.

The logical network control apparatus 103b connected to the LAN 101b (second network) receives a logical network connection request transmitted from the logical network control apparatus 103a connected to the LAN 101a (first network). The logical network control apparatus 103b searches for application properties registered in the logical network control apparatus 103b from the application name included in the logical network connection request, and reads out the discovered application properties (F104). The application properties represent processing by the network connection apparatus 102b. The logical network control apparatus 103b then compares the application properties read out in F104 with the application properties included in the logical network connection request received in F103, and determines whether or not communication can be made via VPN connection (F105). Examples of a case wherein determination is made in F105 that communication can be made via VPN connection include a case wherein the compared application properties are the same, and further, a case wherein judgment is made that the probability that a VPN connection can be made with shared parameters by negotiation is high, and so forth. This judgment will be described later. In the event that determination is made in F105 that communication can be made via VPN connection, the judgment results and the application properties read out in F104 are transmitted to the logical network control apparatus 103a (F106).

The logical network control apparatus 103b compares the application properties transmitted along with the judgment results in F106 with the application properties read out in F102, and judges whether or not communication can be made via VPN connection (F107). This judgment also will be described later. The logical network control apparatus 103a may judge that communication can be made via VPN connection based on the judgment results in F106 alone. That is to say, in the event that the logical network control apparatus 103b has judged that communication can be performed, the logical network control apparatus 103a may judge that communication can be performed based upon this.

In the event that judgment is made that communication can be made via VPN connection in F107, proposed parameters for use with the VPN connection are determined based on the application properties read out in F102 (F108). That is to say, proposed parameters (candidates for conversion parameters) are determined in accordance with processing performed by the network connection apparatus (communication apparatus) 102a. Note that at this time, the logical network control apparatus 103b also determines proposed parameters based on the application properties read out in F104 in the event that judgment is made in F105 that communication can be made (F109). Determination of proposed parameters in F108 and F109 can be made after application properties have been read out in F102 and F104. Also, proposed parameters corresponding to application properties can be stored beforehand. Methods for determining proposed parameters based on application properties will be described later.

The logical network control apparatus 103a and the logical network control apparatus 103b perform negotiation of parameters to be used for VPN connection, using the proposed parameters determined in F108 and F109 (F110). In this negotiation, determination is made regarding such as whether or not to perform encryption or buffering of communication data at the VPN level, for example. Also, in the case of performing buffering, the buffering size may be decided.

In the event that the two proposed parameters differ, VPN connection may be attempted using the proposed parameters of the logical network control apparatus 103b. If the proposed parameters of the logical network control apparatus 103b are transmitted to the logical network control apparatus 103a and the logical network control apparatus 103a accepts these, this means that the negotiation has succeeded. While this arrangement wherein VPN connection is attempted using the proposed parameters of the logical network control apparatus 103b in the event that the two proposed parameters differ is employed with the present embodiment, an arrangement may be made wherein VPN connection is attempted using the proposed parameters of the logical network control apparatus 103a. Also, which of the proposed parameters will be used may be decided based on the types of services provided by the network connection apparatuses 102a and 102b. Further, an arrangement may be made wherein which of the proposed parameters of the logical network control apparatuses 103a and 103b will be used is decided for each parameter item.

In the event that negotiation is successful, VPN connection is started using the parameters determined in the negotiation (F111). Details of the negotiation will be described later.

Figure 5:
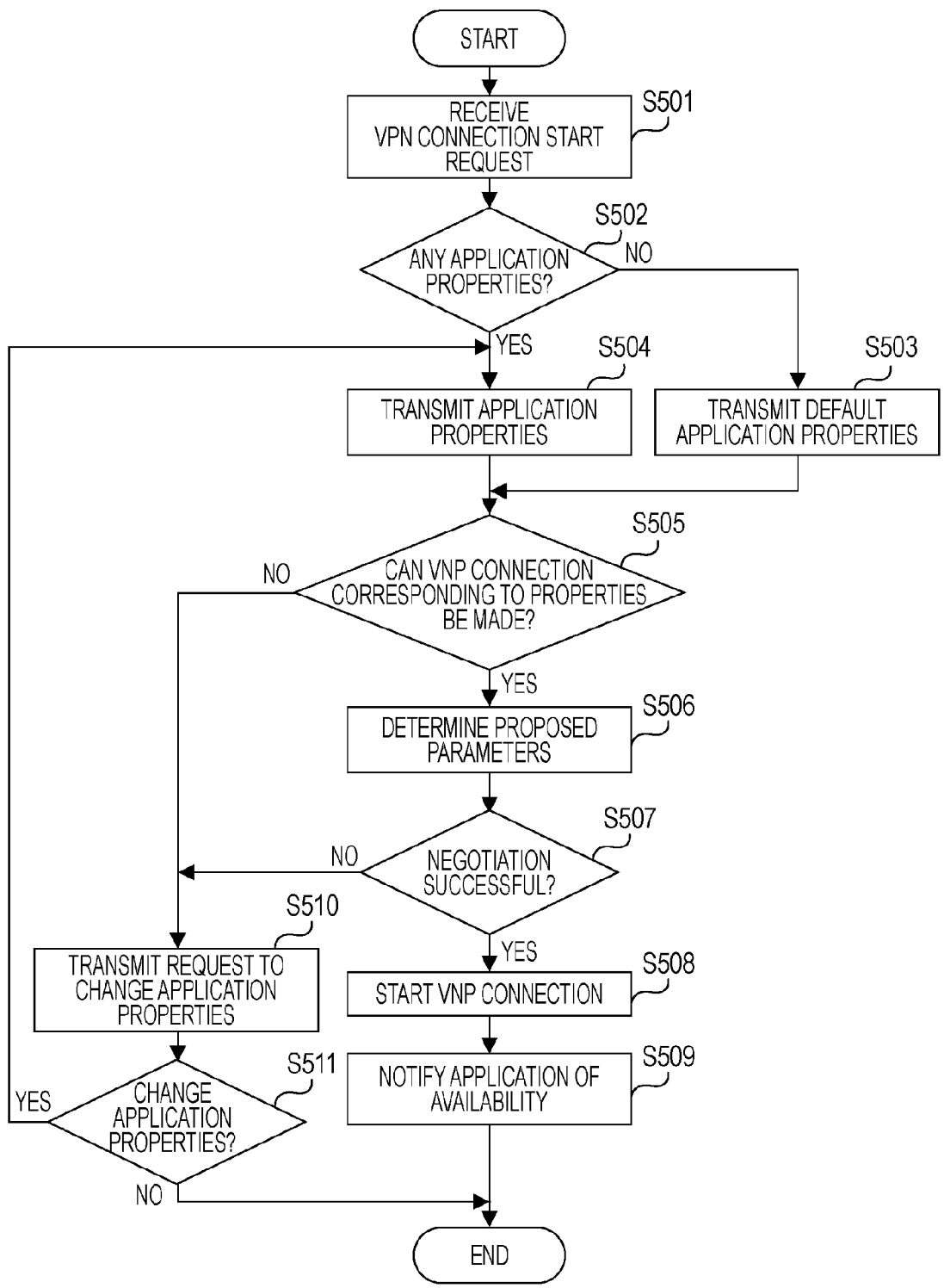
FIG. 5 is a flowchart illustrating the flow of VPN connection starting processing according to the embodiment.

Next, the flow of processing at the logical network control apparatus 103a in the above-described VPN connection start processing will be described in detail with reference to the flowchart in FIG. 5. The logical network control apparatus 103a is a security communication apparatus for realizing communication with security ensured between the LAN 101a (first network) and the LAN 101b (second network). Also, the logical network control apparatus 103b is a security communication apparatus having the same functions as the logical network control apparatus 103a.

In step S501, the logical network control unit 300 of the logical network control apparatus 103a accepts a VPN connection start request from the network connection apparatus 102a. The logical network control unit 300 then hands the application name included in the accepted connection start request to the application property judging unit 302, and the flow advances to step S502. The connection start request includes VPN connection destination information, authentication information, encryption key, application name, and so forth. Now, connection destination information is an address reachable by the logical network control apparatus 103b. Also, the connection start request may also include other identification information such as version information of the application as necessary, for example.

In step S502, the application property judging unit 302 searches for application properties corresponding to the application name handed in step S501. In the event that the application properties which are the object of the search are already registered in the application property judging unit 302, the application property judging unit 302 reads out these application properties, and the flow advances to step S504. On the other hand, in the event that the application property judging unit 302 does not have these application properties corresponding to the application name, the flow advances to step S503. As described earlier, application properties are data type necessity for encryption, higher level encryption, delay, priority, and so forth. Processing such as encryption performed at the higher layer is processing performed by the network connection apparatus 102a.

In step S503, the application property judging unit 302 transmits the logical network connection request including default application properties to the logical network control apparatus 103b, and the flow advances to step S505. Default application properties are set values created assuming an application with the highest usage frequency. However, default application properties may be created based on information other than the usage frequency of application. We will say that the default application properties according to the present embodiment have been created based on application properties of a real-time communication application.

In step S504, the application property judging unit 302 transmits, to the logical network control apparatus 103b, a logical network connection request including the application name received in step S501 and the application properties received in step S502. The flow then advances to step S505.

The application property judging unit 302 of the logical network control apparatus 103b uses the application name transmitted from the logical network control apparatus 103a, and searches application properties registered in the application property judging unit 302. In the event that the relevant application properties have already been registered, the application property judging unit 302 performs comparison with the application properties transmitted in step S504. Also, in the event that the application properties have not been registered, the application property judging unit 302 performs comparison with the default application properties and the application properties transmitted in step S504. Whether or not a VPN connection can be made in accordance with the two application properties is judged as a result of the comparison, and the judgment results are transmitted to the logical network control apparatus 103a. Now, in the event that judgment is made that a VPN connection can be made in accordance with the two application properties, the application properties information registered in the logical network control apparatus 103b is transmitted to the logical network control apparatus 103a along with the judgment results. This judgment will be described later.

In step S505, the application property judging unit 302 of the logical network control apparatus 103a receives the judgment results and application properties transmitted from the logical network control apparatus 103b. That is to say, the application property judging unit 302 of the logical network control apparatus 103a receives the contents of processing performed as to communication data (application properties) by the network connection apparatus 102b (communication apparatus) connected to the LAN 101b (second network).

Judgment of whether a VPN connection can be made with the logical network control apparatus 103b is performed based on the received information. In the event that the application property judging unit 302 judges that a VPN connection can be made based on the application properties, the flow advances to step S506. In the event that the application property judging unit 302 judges that a VPN connection cannot be made based on the application properties, the flow advances to step S510. Examples of a case wherein judgment is made that a VPN connection cannot be made includes cases wherein application properties could not be obtained from the logical network control apparatus 103b, or communication could not be made with the transport protocol. Other examples including the logical network control apparatus 103b being down for some reason, or being cut off from the LAN 101b. The processing of steps S503 through S505 enables the logical network control apparatus 103a to confirm communication with suitable parameters for the network connection destination communication apparatus (network connection apparatus 102b) as well. Still, these steps are not indispensable and may be omitted.

In step S506 (judging procedure), the negotiation unit 301 determines proposed parameters to be used for VPN connection based on the application properties information read out in step S502, and the flow advances to step S507. That is to say, the negotiation unit 301 determines settings for communication (application properties) at the network connection apparatus 102a as to communication data at the time of executing communication. The negotiation unit 301 then determines parameters to be proposed to the logical network control apparatus 103b based on these settings. That is to say, the negotiation unit 301 determines candidates for parameters (proposed parameters) relating to conversion of communication data by the logical network control apparatus 103a, in accordance with settings (application properties) of the network connection apparatus 102a (communication apparatus).

Note that the negotiation unit 301 judges the settings (application properties) of the network connection apparatus 102a (communication apparatus) using the identification information 701 registered in step S402. Now, as described earlier, the identification information 701 is application name, version, IP address of network connection apparatus 102a, port No. which the application uses, and so forth. Also, as described earlier, application properties 702 is data type, necessity of encryption, encryption at higher layer, delay, priority, and so forth, these indicating the settings of the network connection apparatus 102a. The logical network control apparatuses 103a and 103b execute, of the processing necessary for communication between the network connection apparatuses 102a and 102b, processing which the network connection apparatuses 102a and 102b cannot sufficiently provide for. The proposed parameters are equivalent to the processing which the network connection apparatuses 102a and 102b cannot sufficiently provide for.

In step S507, the negotiation unit 301 performs negotiation for parameters used in VPN connection with the logical network control apparatus 103b. Performing negotiation allows the logical network control apparatus 103a to perform communication with VPN connection parameters taking into consideration the application properties of the network connection apparatus 102a and the network connection apparatus 102b. The network connection apparatus 102b is a network connection destination communication apparatus. Note however, that the logical network control apparatus 103b may be instructed to start a VPN connection using the proposed parameters determined in step S506. Details of determining proposed parameters in step S506 and negotiation will be described later. Thus, the logical network control apparatus 103a decides how to perform conversion on the data transmitted form the network connection apparatus 102a to the network connection apparatus 102b so as to ensure security, in accordance with processing performed by the network connection apparatus 102a.

In the event that the negotiation in step S507 has been successful, the flow proceeds to step S508. On the other hand, in the event that the negotiation in step S507 is unsuccessful for some reason, the flow proceeds to step S510.

In step S508, the logical network control unit 300 of the logical network control apparatus 103a starts VPN connection with the logical network control apparatus 103b with the parameters determined by the negotiation in step S507. Upon the VPN connection being started, the flow proceeds to step S509.

That is to say, the logical network control unit 300 receives communication data which has been subjected to processing by the network connection apparatus 102a (reception procedure). The received data is converted to ensure security, in accordance with the settings judged by the negotiation unit 301 (converting procedure). Further, the logical network control unit 300 transmits the converted communication data to the logical network control apparatus 103b connected to the LAN 101b (second network) (transmission procedure). On the other hand, the logical network control unit 300 receives communication data which has been processed for ensuring security, that is transmitted from the logical network control apparatus 103b connected to the LAN 101b (second network). The logical network control unit 300 then converts the received communication data in accordance with settings determined by the negotiation unit 301. Further, the converted communication data is transmitted to the network connection apparatus 102a connected to the LAN 101a.

In step S509, the logical network control unit 300 notifies completion of the VPN connection to the application of the network connection apparatus 102a, and ends VPN connection start processing.

In step S510, the logical network control unit 300 notifies the application of the network connection apparatus 102a with a message indicating that VPN connection has failed, and a message prompting changing of application properties, and the flow advances to step S511.

In step S511, the logical network control unit 300 performs judgment regarding whether or not a changing request of application properties has been input from the application at the network connection apparatus 102a. In the event that judgment is made by the logical network control unit 300 that a changing request of application properties has been input from the application of the network connection apparatus 102a, the logical network control unit 300 receives the new application properties. The logical network control unit 300 then hands the new application properties to the application property judging unit 302, and the flow advances to step S504.

In the event that determination is made by the logical network control unit 300 in step S511 that no changing request of application properties has been input from the application at the network connection apparatus 102a, VPN connection start processing ends. That is to say, the logical network control unit 300 receives data (proposed parameters) from the logical network control apparatus 103b. In the event that the received data is data indicating that communication cannot be made between the LAN 101a (first network) and the LAN 101b (second network), change of processing (application properties) by the network connection apparatus 102a is accepted. An example of a case wherein determination is made by the logical network control unit 300 in step S511 that no changing request of application properties has been input, is a case wherein the network connection apparatus 102a transmits a message to the effect that application properties will not be changed. Also, an arrangement may be made wherein the logical network control unit 300 of the logical network control apparatus 103a judges that changing of application properties is not being requested, by waiting a certain amount of time.

In this way, the logical network control unit 300 can make judgment regarding changing of application properties both actively and passively. An arrangement may also be made wherein application properties are changed at the network connection apparatus 102b.

Thus, in the event of failing in a VPN connection, network connection parameters according to communication data processing at the communication apparatus (network connection apparatus) can be efficiently determined by accepting changes to application properties. Still, this processing is not indispensable and may be omitted.

As described above, first, the logical network control apparatus 103a (security communication apparatus) judges settings for communication at the communication apparatus at the time of executing communication, using application information registered from the network connection apparatus 102a (communication apparatus) beforehand. The communication data is then converted in accordance with the judged settings. Thus, at the time of communication apparatuses exchanging data based on network connection by security communication apparatuses, the security communication apparatus can perform network connection taking into consideration processing which the communication apparatuses perform on the communication data.

Next, determining of proposed parameters used for VPN connection in step S506, and negotiation procedures between the logical network control apparatus 103a and the logical network control apparatus 103b in step S507, will be described by way of examples.

First, in step S506, the negotiation unit 301 of the logical network control apparatus 103a determines proposed parameters, based on the application properties information read out in step S502. The proposed parameters are candidates for parameters relating to conversion of communication data performed by the security communication apparatus.

FIG. 9 shows an example of proposed parameters for each application (proposed parameters determined from the application properties). Applications 1 through 6 indicated by reference numeral 901 in FIG. 9 correspond to those indicated by reference numeral 801 in FIG. 8.

The transport protocol 902 is a parameter indicating the transport protocol used in VPN connection, and with the present embodiment, UDP is used preferentially. However, other transport protocols such as TCP and so forth may be used for connection, depending on the connection environment and network environment.

Packet encryption 903 is a parameter indicating whether to perform encryption on the VPN connection itself. In the event that there is necessity for packet encryption 903, the logical network control apparatus 103 performs VPN connection with packet encryption, and in the event that there is no necessity for packet encryption 903, the logical network control apparatus 103 performs VPN connection without packet encryption.

Packet compression 904 is a parameter indicating whether or not to perform packet compression at the time of performing VPN connection. In the event that packet encryption is available, packet encryption is performed between the logical network control apparatuses 103, and in the event that packet encryption is unavailable, packet encryption is not performed between the logical network control apparatuses 103.

Buffering 905 is a parameter indicating whether or not to perform buffering at the time of performing VPN connection. In the event that buffering is available, packet buffering is performed between the logical network control apparatuses 103, and in the event that buffering is unavailable, packet buffering is not performed between the logical network control apparatuses 103. Note that in the event that buffering 905 is available, the buffering size may also be included in the parameter.

Priority control 906 is a parameter indicating the priority of packets at the time of performing VPN connection. In the event that the priority control 906 is "high", the logical network control apparatuses 103 perform processing on the data of that application with the highest priority. In the event that the priority control 906 is "mid", the logical network control apparatuses 103 perform processing with standard priority. In the event that the priority control 906 is "low", the logical network control apparatuses 103 perform processing on the data of other applications with priority.

For example, in the case of the application shown in FIG. 7, the application properties are those of the application 2 in FIG. 8. That is to say, there is necessity of encryption, there is no encryption at the higher layer, the delay is low delay, and priority is "mid". In step S506, the negotiation unit 301 decides the proposed parameters to be used for VPN connection as shown in the application 2 in FIG. 9, based on the application properties. That is to say, transport protocol 902 is "UDP", packet encryption 903 is "necessary", packet compression 904 is "unavailable", buffering 905 is "unavailable", and priority control 906 is "mid". Note that in this case, encryption is necessary, but since the higher layer (network connection apparatus 102a) does not perform encryption, the logical network control apparatus 103a performs encryption.

Further, determination of proposed parameters in step S506 will be described with the example of the application 3 in FIG. 8. With this application 3, encryption 803 is set to "yes", and higher layer encryption 804 is also set to "yes". As described earlier, this means that encryption of communication data is performed, and that encryption of communication data is performed at the application level which is the higher layer. Now, even of the communication of the application 3 being used requires encryption, this does not always mean that further encryption is necessary at the VPN if encryption of communication data is being performed at the application level. Accordingly, the negotiation unit 301 determines that the item of packet encryption 903, indicating whether or not encrypted VPN connection is to be performed, is unnecessary, as shown in application 3 in FIG. 9. That is to say, at the time of executing communication, the negotiation unit 301 judges settings for communication (application properties) at the network connection apparatus 102a (communication apparatus). In this case, the network connection apparatus 102a is judged to perform encryption. The negotiation unit 301 determines parameters to be proposed to the logical network control apparatus 103b based on these settings.

Also, in step S506, judgment is made regarding the delay amount which the application to be used permits, and proposed parameters such as buffering size and whether or not to perform packet compression can be determined based on the judged delay amount and the delay amount for PVN encapsulation or encryption. Accordingly, a network connection can be realized which takes into consideration communication apparatus settings.

Note that the above parameters are only examples, and that other parameters can be applied as well. Also note that the logical network control apparatus 103b decides on proposed parameters in the same way as with the logical network control apparatus 103a.

Next, the procedures of negotiation (step S507) taking place between the logical network control apparatus 103a and the logical network control apparatus 103b will be described.

The negotiation unit 301 of the logical network control apparatus 103a transmits proposed parameters determined in step S506 (parameter candidates relating to communication data conversion performed by security communication apparatuses) to the logical network control apparatus 103b. That is to say, the negotiation unit 301 of the logical network control apparatus 103a transmits the proposed parameters determined in step S506 to the logical network control apparatus 103b (second security communication apparatus) connected to the LAN 101b (second network). The negotiation unit 301 of the logical network control apparatus 103b which has received the proposed parameters from the logical network control apparatus 103a performs comparison thereof with the proposed parameters which it has determined itself. In the event that the parameters match in this case, judgment is made that negotiation has succeeded, and VPN connection is performed using the matched parameters. In the event that judgment is made that the proposed parameters differ, messages are exchanged between the logical network control apparatus 103a and the logical network control apparatus 103b, to determine parameters to be used in the VPN connection.

With the present embodiment, in the event that determination is made that the two sets of proposed parameters differ, a VPN connection is attempted using, for example, the proposed parameters of the logical network control apparatus 103b which is the receiving side of the logical network connection request (steps S503 and S504). That is to say, the exchanged messages including a message wherein the logical network control apparatus 103b notifies its own proposed parameters to the logical network control apparatus 103a. The negotiation unit 301 of the logical network control apparatus 103a receives the proposed parameters which the logical network control apparatus 103b has determined. Further, the logical network control unit 300 of the logical network control apparatus 103a converts the communication data in accordance with the received data (proposed parameters). Note however, that VPN connection may be performed with the proposed parameters of the logical network control apparatus 103a. Also, which of the proposed parameters to employ may be determined based on service types provided by the network connection apparatuses 102a and 102b. Further, the proposed parameters of which network connection apparatus 102 to use may be determined for each parameter item.

In the event of accepting the parameters proposed by the logical network control apparatus 103b at the logical network control apparatus 103a, the flow proceeds to step S508, and VPN connection is started. On the other hand, in the event of not accepting the parameters proposed by the logical network control apparatus 103b at the logical network control apparatus 103a, the flow proceeds to step S510, and the network connection apparatus 102a is notified with a message indicating that VPN connection has failed, and a message prompting changing of application properties.

Description will be made regarding an example of a case wherein the logical network control apparatus 103a accepts the proposed parameters. Let us say that for example, the application properties regarding encryption are "no" for encryption 803 and "no" for higher layer encryption 804 at the logical network control apparatus 103a side which is the side transmitting the logical network connection request (steps S503 and S504). On the other hand, let us say that the application properties regarding encryption are "yes" for encryption 803 and "no" for higher layer encryption 804 at the logical network control apparatus 103b side which is the side receiving the logical network connection request. In this case, the logical network control apparatus 103a (and logical network control apparatus 103b) judge in step S505 that connection in accordance with application properties can be made. In step S506, the logical network control apparatus 103a judges that there is no need for encryption of communication data, and determines proposed parameters such that encryption of communication data is not performed at the VPN level (no need for packet encryption 903). On the other hand, the proposed parameters decided at the logical network control apparatus 103b side indicating encryption being performed at the VPN level (need for packet encryption 903). In this case, the logical network control apparatus 103a changes it own parameters such that encryption is performed at the VPN level.

Also, let us say that the application properties relating to encryption at the logical network control apparatus 103a side are "yes" for encryption 803 and "yes" for higher layer encryption 804, and moreover, that the application properties relating to encryption at the logical network control apparatus 103b side are "yes" for encryption 803 and "yes" for higher layer encryption 804. Let us further say that at this time, the proposed parameters of the logical network control apparatus 103a say that packet encryption 903 is not necessary, and the proposed parameters of the logical network control apparatus 103b say that packet encryption 903 is necessary. In this case, the logical network control apparatus 103a judges that double encryption of the communication data is being requested at the connection destination application, and can accept the proposed parameters.

On the other hand, an example of a case wherein the logical network control apparatus 103a does not accept the proposed parameters transmitted from the logical network control apparatus 103b will be described. Let us say that for example, the application properties regarding encryption are "yes" for encryption 803 and "no" for higher layer encryption 804 at the logical network control apparatus 103a side, and that the application properties regarding encryption are "no" for encryption 803 and "no" for higher layer encryption 804 at the logical network control apparatus 103b side. That is to say, this is case wherein, while the application properties relating to necessity of encryption differ, the application properties relating to higher layer encryption are the same. In such a case, in step S505 the logical network control apparatus 103a judges that VPN connection based on application properties can be made. Also, in the same way, the logical network control apparatus 103b judges that VPN connection based on application properties can be made.

In step S506, the logical network control apparatus 103a determines proposed parameters with packet encryption 903 (encryption at the VPN level) necessary. However, let us say that the parameters proposed from the logical network control apparatus 103b say that VPN level encryption is not to be performed.

In this case, if the proposed parameters from the logical network control apparatus 103b are accepted, this will mean that encryption is not performed with application communication on the logical network 103a which needs encryption of communication data, nether at the upper layer nor at the VPN level. In such a case, the logical network control apparatus 103a does not accept the proposed parameters. Also, an arrangement may be made regarding such a case wherein the proposed parameters which the logical network control apparatus 103a has determined in step S506 are proposed to the logical network control apparatus 103b.

In this way, performing negotiation enables communication to be performed with VPN connection parameters taking into consideration application properties of the communication apparatus (network connection apparatus 102b) with which connection is being made over the network. Note that the logical network control apparatus 103b may be instructed to start VPN connection using the proposed parameters decided in step S506.

The logical network control unit 300 of the logical network control apparatus 103a performs VPN connection performed with the logical network control apparatus 103b based on the parameters decided as described above. That is to say, the logical network control unit 300 performs communication data conversion in accordance with settings determined by the negotiation unit 301 (properties of an application used by the network connection apparatus 102a).

Figure 6:
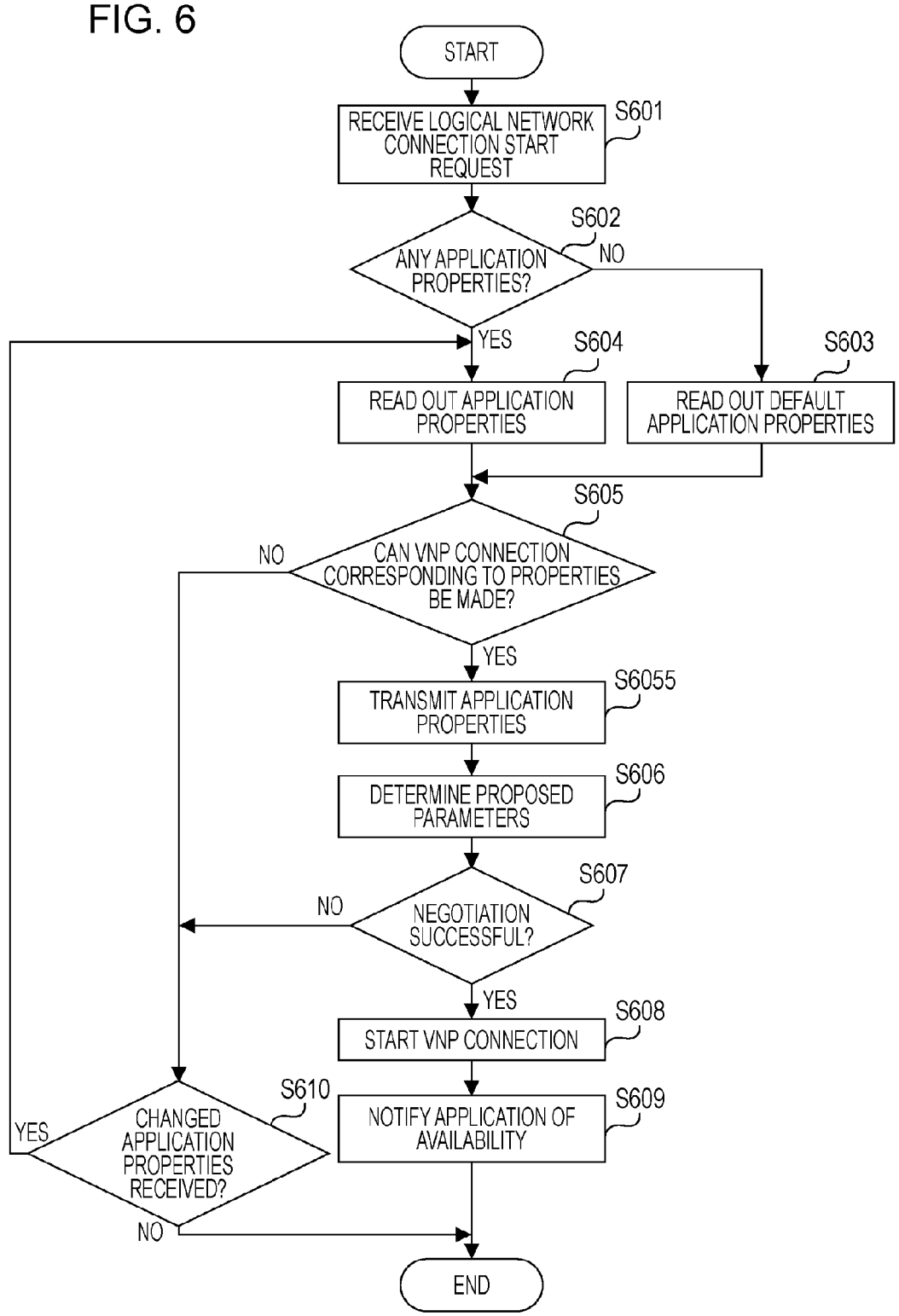
FIG. 6 is a flowchart illustrating the flow of processing performed at the time of a logical network control apparatus receiving a logical network connection request with the embodiment.

Next, description will be made regarding processing at the logical network control apparatus 103b which has received a logical network connection request, with reference to FIG. 6. FIG. 6 is a flowchart illustrating the flow of VPN connection start processing starting from the logical network control apparatus 103b receiving the logical network connection request. Note that in the event that the logical network control apparatus 103a receives a logical network connection request from the logical network control apparatus 103b as well, the same processing as with that in FIG. 6 is performed.

In step S601, the logical network control unit 300 of the logical network control apparatus 103b receives a logical network connection request from the logical network control apparatus 103a. The logical network control unit 300 hands the application name and application properties included in the received logical network connection request to the application property judging unit 302, and the flow advances to step S602.

In step S602, the application property judging unit 302 searches for application properties corresponding to the application name handed thereto in step S601. In the event that the application property judging unit 302 succeeds in the search for application properties, the flow proceeds to step S604. On the other hand in the event that the application property judging unit 302 fails in the search for application properties, the flow proceeds to step S603.

In step S603, the application property judging unit 302 reads out default application properties, and the flow proceeds to step S605.

In step S604, the application property judging unit 302 reads out the application properties obtained by the search in step S602, and the flow proceeds to step S605.

In step S605, the application property judging unit 302 compares the application properties received in step S601 with the application properties read out in step S603 or step S604. The application property judging unit 302 of the logical network control apparatus 103b judges whether or not VPN connection corresponding to the two application properties can be made.

An example of a case wherein judgment is made in step S605 that connection corresponding to the two application properties can be made is a combination of application properties such as shown in FIG. 8 for example, wherein only the priority 806 differs. In this case, for example, VPN connection parameters are decided in accordance with the one that has higher priority 806, i.e., the side in which the application requests higher priority in the later-described negotiation.

Another example to be considered is a case wherein the encryption 803 at the logical network control apparatus 103a side is "yes" and higher layer encryption 804 is "no", for example. In this case, if the encryption 803 at the logical network control apparatus 103*b* side is "no" and higher layer encryption 804 is "no", VPN connection is judged to be possible. In this case, VPN connection may be able to be performed by enabling VPN level encryption (packet encryption 903 necessary) at the VPN level.

On the other hand, an example of a case wherein judgment is made in step S605 that VPN connection in accordance with application properties cannot be made is a case wherein the application properties differ regarding upper level encryption 804. In this case, judgment is made that communication cannot be performed between the network connection apparatuses 102 based on VPN connection, regardless of how VPN connection parameters are set. In such a case, in step S605 the application property judging unit 302 judges that VPN connection cannot be performed in accordance with application properties. Also, with the present embodiment, the application property judging unit 302 judges that VPN connection in accordance with application properties cannot be made in cases wherein the data type 802 which the applications handle differ, as well.

In the event that judgment is made that the application property judging unit 302 that VPN connection in accordance with application properties can be made, the application properties read out in step S603 or step S604 are transmitted to the logical network control apparatus 103*a* (step S6055), and the flow proceeds to step S606.

In the event that the application property judging unit 302 judges that VPN connection in accordance with application properties cannot be made, judgment results indicating this judgment are transmitted to the logical network control apparatus 103*a*, and the flow proceeds to step S610.

In step S606, the negotiation unit 301 of the logical network control apparatus 103*b* determined proposed parameters based on the application properties read out in step S603 or S604, and the flow advances to step S607. Procedures for deciding proposed parameters based on application properties are as described above.

In step S607, the negotiation unit 301 of the logical network control apparatus 103*b* performs negotiation with the logical network control apparatus 103*a* regarding parameters to be used for VPN connection.

Now, the negotiation procedures at the logical network control apparatus 103*b* which has received a logical network connection request from the logical network control apparatus 103*a* will be described. First, proposed parameters are received from the logical network control apparatus 103*a*. Next, the negotiation unit 301 of the logical network control apparatus 103*b* compares the proposed parameters received from the logical network control apparatus 103*a* with the proposed parameters decided in step S606. Now, in the event that the proposed parameters match, judgment is made that negotiation has succeeded, and VPN connection is performed using the matching parameters.

On the other hand, in the event that judgment is made that the proposed parameters differ, messages are exchanged between the logical network control apparatus 103*a* and the logical network control apparatus 103*b*, to determine parameters to be used in the VPN connection. With the present embodiment, in the event that determination is made that the two sets of proposed parameters differ, a VPN connection is attempted using, for example, the proposed parameters of the logical network control apparatus 103*b* which is the receiving side of the logical network connection request (F103). That is to say, the exchanged messages including a message wherein the logical network control apparatus 103*b* notifies its own proposed parameters to the logical network control apparatus 103*a*. Note however, that VPN connection may be performed with the proposed parameters of the logical network control apparatus 103*a*. Also, which of the proposed parameters to employ may be determined based on service types provided by the network connection apparatuses 102*a* and 102*b*. Further, the proposed parameters of which network connection apparatus 102 to use may be determined for each parameter item.

In this way, performing negotiation enables communication to be performed with VPN connection parameters taking into consideration application properties of the communication apparatus (network connection apparatus 102*b*) with which connection is being made over the network. Note that the logical network control apparatus 103*b* may be instructed to start VPN connection using the proposed parameters decided in step S506.

In the event that negotiation is successful, the flow proceeds to step S608, and the event that negotiation is unsuccessful for some reason, the flow proceeds to step S610.

In step S608, the logical network control unit 300 of the logical network control apparatus 103*b* starts VPN connection with the logical network control apparatus 103*a* using the parameters decided in step S607, and the flow proceeds to step S609.

In step S609, the logical network control unit 300 notifies completion of VPN connection to the application of the network connection apparatus 102*b*, and the processing ends.

In step S610, the logical network control unit 300 determines whether or not application properties which have been changed by processing in step S511 have been transmitted. In the event that the logical network control unit 300 has received new application proprieties transmitted from the logical network control apparatus 103*a*, the flow returns to step S605. In the event that the logical network control unit 300 has not received changed application proprieties from the logical network control apparatus 103*a*, the processing ends.

An example of a case wherein determination is made in step S610 that the logical network control unit 300 has not received changed application proprieties is a case wherein a message is received from the logical network control apparatus 103*a* that application properties will not be changed. Also, an arrangement may be made wherein the logical network control unit 300 awaits a predetermined amount of time, and if changed application properties are not received within that time, determination is made that there will be no change in application properties.

In this way, the logical network control unit 300 can make judgment regarding changing of application properties both actively and passively. An arrangement may also be made wherein application properties are changed at the network connection apparatus 102*b*.

Thus, in the event of failing in a VPN connection, network connection parameters according to communication data processing at the communication apparatus (network connection apparatus) can be efficiently determined by accepting changes to application properties. Still, this processing is not indispensable and may be omitted.

Note that the VPN according to the present embodiment is not restricted to a single VPN such as layer 2 VPN or layer 3 VPN, and can be applied to various types of VPNs.

Also, while the present embodiment has illustrated an example of a single pair of logical network control apparatuses, the present invention is not restricted to this arrangement, and three or more logical network control apparatuses may be connected. In this case, exchange of messages including logical network parameters is performed among the three or more apparatuses, thereby deciding the logical network parameters.

Also, while description has been made with the present embodiment regarding a case wherein the logical network control apparatuses obtain application information beforehand by processing such as in FIG. 4, the present invention is not restricted to this arrangement, and an arrangement may be made wherein the logical network control apparatuses 103 obtain application information by referring to communication data from the network connection apparatuses 102. That is to say, the logical network control apparatuses 103 may be arranged to refer to header information of communication data for example, so as to judge what the application corresponding to that communication data is. Also, an arrangement may be made wherein a logical network control apparatus 103 judges whether or not communication data is encrypted by referring to the communication data, for example, and determine the processing of the logical network control apparatus 103 based on the judgment results.

This concludes description of the first embodiment of the present invention.

The present invention may also be carried out by supplying, to a system or an apparatus, a recording medium in which is recorded program code of software realizing the functions of the above-described first embodiment, with a computer (or CPU or MPU) of the system or apparatus reading out and executing the program for stored in the recording medium. In this case, the program code itself read out from the recording medium realizes the functions of the above-described first embodiment, and the storage medium in which the program code is stored makes up the present embodiment.

Examples of recording media by which the program code is supplied include flexible disks, hard disks, optical discs such as CD-ROM, CD-R, and DVD, magneto-optical disks, magnetic tape, non-volatile memory cards, ROM, and so forth.

Also, the present invention is not restricted to an arrangement wherein the functions of the above-described embodiment are realized by a computer executing the program code that has been read out. That is to say, the present invention also includes cases wherein an Operating System (OS) running on the computer executes part or all of the actual processing based on commands of the program code, whereby the functions of the above-described embodiment are realized.

The present invention further encompassed an arrangement wherein the program code read out from the storage medium is written to memory provided to a function expansion board inserted into the computer or a function expansion unit connected to the computer, following which a CPU or the pike provided to the function expansion board or function expansion unit performs part or all of the actual processing, whereby the functions of the above-described embodiment are realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-001395 filed Jan. 8, 2008, which is hereby incorporated by reference herein in its entirety.

What is claimed is:

1. A security communication apparatus including at least one processor and memory storing computer-executable instructions communicatively-coupled via a bus, connected to a first network and configured to set a virtual private network on a second network between the security communication apparatus and a second security communication apparatus, the security communication apparatus comprising:
   a receiving unit configured to receive a request related to the virtual private network between the security communication apparatus and the second security communication apparatus, first communication data and second communication data from a transmission apparatus via the first network;
   a converting unit configured to encrypt the first communication data which is not encrypted by the transmission apparatus and received from the transmission apparatus, into third communication data;
   a setting unit configured to set the virtual private network on the second network in accordance with the request related to the virtual private network; and
   a transmitting unit configured to transmit the second communication data which is encrypted by the transmission apparatus and received in an encrypted state from the transmission apparatus, to the second security communication apparatus via the virtual private network when it is indicated in accordance with the request related to the virtual private network that the second communication data is encrypted by the transmission apparatus, and when it is indicated in accordance with the request related to the virtual private network that the first communication data is not encrypted by the transmission apparatus, transmit the third communication data encrypted by the converting unit from the first communication data which is not encrypted by the transmission apparatus and received in an unencrypted state from the transmission apparatus, to the second security communication apparatus in an encrypted state via the virtual private network.

2. The security communication apparatus according to claim 1, further comprising a determining unit configured to determine settings relating to permitted delay time of communication data at a communication apparatus connected to the first network, and
   wherein the transmitting unit transmits the second and third communication data to the second security communication apparatus, in accordance with settings relating to permitted delay time determined by the determining unit.

3. The security communication apparatus according to claim 1, further comprising:
   a determining unit configured to determine candidates of conversion parameters relating to encryption of the first communication data by the converting unit;
   a second transmitting unit configured to transmit candidates of converting parameters determined by the determining unit to the second security communication apparatus; and
   a receiving unit configured to receive the contents of encryption processing decided by the second security communication apparatus, based on transmission of the conversion parameters by the second transmitting unit;
   wherein the converting unit encrypts the first communication data in accordance with the contents of encryption processing received by the receiving unit.

4. The security communication apparatus according to claim 3, further comprising:
   an accepting unit configured to accept changing of settings of the transmission apparatus, when indication received by the receiving unit indicates that communication cannot be performed between the first network and the second network.

5. The security communication apparatus according to claim 1, further comprising:
a storing unit configured to store settings relating to encryption of communication data at the transmission apparatus connected to the first network, and identification information of the settings, and
a determining unit configured to determine whether the communication data is to be encrypted by the transmission apparatus connected to the first network, based on the identification information of settings stored by the storing unit and received from the transmission apparatus connected to the first network.

6. The security communication apparatus according to claim 1, further comprising:
a storing unit configured to store settings relating to encryption of communication data at the transmission apparatus connected to the first network, and identification information of the settings; and
a determining unit configured to determine whether the communication data is to be encrypted by the transmission apparatus connected to the first network, based on the identification information of settings stored by the storing unit and received from the transmission apparatus connected to the first network.

7. The apparatus according to claim 1, further comprising an obtaining unit configured to obtain from a storage unit first data indicating whether communication data is to be transmitted in the encrypted state to the second security communication apparatus and second data indicating whether the transmission apparatus connected to the first network encrypts the first and second communication data.

8. The apparatus according to claim 1, wherein the transmitting unit negotiates with the second security communication apparatus whether the first communication data is to be transmitted or the third communication data is to be transmitted to the second security communication apparatus.

9. A security communication method whereby a security communication apparatus connected to a first network sets virtual private network on a second network between the security communication apparatus and a second security communication apparatus the method comprising:
receiving a request related to the virtual private network between the security communication apparatus and the second security communication apparatus, first communication data and second communication data from a transmission apparatus via the first network;
encrypting the first communication data which is not encrypted by the transmission apparatus and received from the transmission apparatus, into third communication data;
setting the virtual private network on the second network in accordance with the request related to the virtual private network; and
transmitting, when it is indicated in accordance with the request related to the virtual private network that the second communication data is encrypted by the transmission apparatus, the second communication data which is encrypted by the transmission apparatus and received in an encrypted state from the transmission apparatus, to the second security communication apparatus via the virtual private network, and
when it is indicated in accordance with the request related to the virtual private network that the first communication data is not encrypted by the transmission apparatus, transmitting the third communication data encrypted in the encrypting process from the first communication data which is not encrypted by the transmission apparatus and received in an unencrypted state from the transmission apparatus, to the second security communication apparatus in an encrypted state via the virtual private network.

10. The method according to claim 9, further comprising obtaining from a storage unit first data indicating whether communication data is to be transmitted in the encrypted state to the second security communication apparatus and second data indicating whether the transmission apparatus connected to the first network encrypts the first and second communication data.

11. The method according to claim 9, wherein the transmitting step negotiates with the second security communication apparatus whether the first communication data is to be transmitted or the third communication data is to be transmitted to the second security communication apparatus.

12. A non-transitory computer readable medium containing computer-executable instructions for a computer including at least one processor and memory communicatively-coupled via a bus, connected to a first network, the medium comprising:
computer-executable instructions for receiving a request related to a virtual private network via a second network between the computer and a second security communication apparatus, first communication data and second communication data from a transmission apparatus via the first network;
computer-executable instructions for encrypting the first communication data which is not encrypted by the transmission apparatus and received from the transmission apparatus into third communication data;
computer-executable instructions for setting the virtual private network on the second network in accordance with the request related to the virtual private network; and
computer-executable instructions for transmitting, when it is indicated in accordance with the request related to the virtual private network that the second communication data is encrypted by the transmission apparatus, the second communication data which is encrypted by the transmission apparatus and received in an encrypted state from the transmission apparatus, to the second security communication apparatus via the virtual private network and when it is indicated in accordance with the request related to the virtual private network that the first communication data is not encrypted by the transmission apparatus, the third communication data encrypted in the encrypting process from the first communication data which is not encrypted by the transmission apparatus and received in an unencrypted state from the transmission apparatus, to the second security communication apparatus in an encrypted state via the virtual private network.

13. The medium according to claim 12, further comprising computer-executable instructions for obtaining from a storage unit first data indicating whether communication data is to be transmitted in the encrypted state to the second security communication apparatus and second data indicating whether the transmission apparatus connected to the first network encrypts the first and second communication data.

14. The medium according to claim 12, wherein the transmitting instructions negotiate with the second security communication apparatus whether the first communication data is to be transmitted or the third communication data is to be transmitted to the second security communication apparatus.

15. A security communication apparatus including at least one processor and memory storing computer-executable instructions communicatively-coupled via a bus, connected to a first network and configured to set a virtual private network for secure communication via a second network between the security communication apparatus and a second security communication apparatus, the security communication apparatus comprising:
- a receiving unit configured to receive a request related to the virtual private network between the security communication apparatus and the second security communication apparatus, first communication data from a transmission apparatus via the first network;
- a converting unit configured to encrypt the first communication data received from a transmission apparatus on the first network, into second communication data;
- a managing unit configured to manage a first security setting indicating whether or not the security communication apparatus encrypts the first communication data received from the transmission apparatus into the second communication data and transmits the second communication data to the second security communication apparatus, and a first priority of the first security setting; and
- a determining unit configured to determine, based on the first security setting and the first priority managed by the managing unit and a second security setting and a second priority of the second security setting indicated by the second security communication apparatus, whether the second communication data encrypted by the converting unit or the first communication data received from the transmission apparatus is transmitted to the second security communication apparatus via the virtual private network in accordance with reception of the first communication data from the transmission apparatus,
wherein the second security setting indicates whether or not the security communication apparatus encrypts the first communication data received from the transmission apparatus into the second communication data and transmits the second communication data to the second security communication apparatus via the virtual private network.

* * * * *